United States Patent [19]
Shin

[11] Patent Number: 5,892,669
[45] Date of Patent: Apr. 6, 1999

[54] ELECTRONIC PRODUCTS WITH IMPROVED SURGE PROTECTING CIRCUIT

[75] Inventor: Ki-Ho Shin, Kyungki-do, Rep. of Korea

[73] Assignee: Samsung Electronics Co., Ltd., Suwon, Rep. of Korea

[21] Appl. No.: 978,950

[22] Filed: Nov. 26, 1997

[30] Foreign Application Priority Data

Nov. 29, 1996 [KR] Rep. of Korea .................. 1996-59939
Sep. 26, 1997 [KR] Rep. of Korea .................. 1997-48923

[51] Int. Cl.$^6$ ................................. H02H 7/10; H02H 1/00
[52] U.S. Cl. ................................. 363/50; 361/40; 361/126
[58] Field of Search ......................... 363/34, 50; 361/40, 361/56, 111, 119, 120, 126, 138

[56] References Cited

U.S. PATENT DOCUMENTS

| | | | |
|---|---|---|---|
| 509,783 | 11/1893 | Wurts | 361/126 |
| 1,865,273 | 6/1932 | Palueff | 361/40 |
| 2,087,340 | 7/1937 | Davis | 307/90 |
| 4,689,713 | 8/1987 | Hourtane et al. | 361/111 |
| 4,743,997 | 5/1988 | Carpenter, Jr. | 361/126 |
| 5,198,791 | 3/1993 | Shibayama et al. | 361/124 |
| 5,317,469 | 5/1994 | Lu | 361/40 |
| 5,555,150 | 9/1996 | Newman, Jr. | 361/56 |

*Primary Examiner*—Stuart N. Hecker
*Attorney, Agent, or Firm*—Dilworth & Barrese

[57] ABSTRACT

An improved surge protecting circuit which can protect the power source and the internal and external circuit elements of an electronic product by absorbing external surges through ground. The protecting circuit according to the present invention is connected between an AC input terminal and an AC ground pattern. The protecting circuit includes surge absorption patterns having an arc discharge gap of preferably 0.25 mm, which is less than a specified safety distance, which is typically 5 mm, so as to absorb the external surges transmitted through the terminal to the AC ground pattern and a varistor connected between the surge absorption patterns and the AC ground patterns.

4 Claims, 2 Drawing Sheets

ELECTRONIC PRODUCTS WITH IMPROVED SURGE PROTECTING CIRCUIT

BACKGROUND OF THE INVENTION

1. Field of the Invention

The present invention relates to an improved surge protecting circuit for electronic products and, more particularly, to a surge protecting circuit which can protect the power source and the internal and external circuit elements of an electronic product by absorbing external surges through ground.

2. Description of the Related Art

Generally, since various electronic products such as televisions or video cassette recorders are connected to an antenna, they are subject to damage caused by external surges, such as lightning, which may conduct through the antenna to the electronic product. Therefore, there are certain safety measures which may be taken to protect the products from these external surges.

For example, referring to FIG. 1, an AC (alternating current) ground pattern 12 of an AC (alternating current) input circuit 10 of a conventional electronic product is grounded through an AC input node having a current path to ground, whereas a DC (direct current) ground pattern 22 of a DC operating circuit 20, which is operated by receiving power through a secondary winding of a transformer T from the AC input circuit 10, is electrically floated. Therefore, external surges received by the DC operating circuit 20 through an antenna are transmitted to the AC ground pattern 12 through the DC ground pattern 22 by an arc discharge between terminals 32 and 34 of a surge protecting pattern 30, and absorbed to the ground through the AC input node.

An arc discharge gap between the terminals 34 and 32 of the surge protecting pattern 30 is specified to a safety distance, which is typically 5 mm. The terminals 34 and 32 of the surge protecting pattern 30 should be separated from each other by the specified safety distance or more in order to prevent impulse noise generated from an AC power source from being transmitted to the DC operating circuit 20 through the arc discharge gap. Although this safety distance is effective to isolate the noise generated by the AC power source, it is not as effective to provide substantial protection against damage to the DC operating circuit from external surges.

Recently, due to the increasing use of components such as microprocessors and integrated circuits in electronic products, which components are more sensitive to electrical surges, the industry has demanded a more definite protection against such surges.

SUMMARY OF THE INVENTION

It is therefore an object of the present invention to provide an improved surge protecting circuit for electronic products which facilitates an arc discharge by reducing an arc discharge gap and which effectively cuts off noise.

In one aspect of the present invention, an improved surge protecting circuit for an electronic product includes: an alternating current (AC) input circuit responsive to an AC power source, having an AC ground pattern associated therewith, the AC input circuit including: a rectifying circuit connected to the AC power source for rectifying AC power from the AC power source, the rectifying circuit being connected to the AC ground pattern; a switch regulating circuit which connected to the rectifying circuit and the AC ground pattern; a transformer having a primary winding and a secondary winding, with the primary winding being connected to the regulating circuit for receiving power, the primary winding being connected to the AC ground pattern; surge absorption pattern having a pair of terminals, which terminals are separated by an arc discharge gap which is smaller than a safety distance and one of the terminals being connected to an AC input terminal of the AC input circuit; and a varistor connected in series between the other terminal of said surge absorption pattern and the AC ground pattern; and a direct current (DC) operating circuit being electromagnetically coupled to the AC input circuit through the transformer and having a DC ground pattern associated therewith which is separated from the AC ground pattern by said safety distance or more, the DC operating circuit including: a DC circuit, with the DC circuit receiving power from the secondary winding of the transformer, with both the DC circuit and the secondary winding being connected to the DC ground pattern; and a terminal to which external surges are transmitted, the terminal being connected to said DC circuit, whereby external surges received by the terminal are transmitted through the DC operating circuit to said AC input circuit through an arc discharge between the DC ground pattern and the AC ground pattern, whereby the external surge is then absorbed by an arc discharge in the arc discharge gap of the surge absorption patterns.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
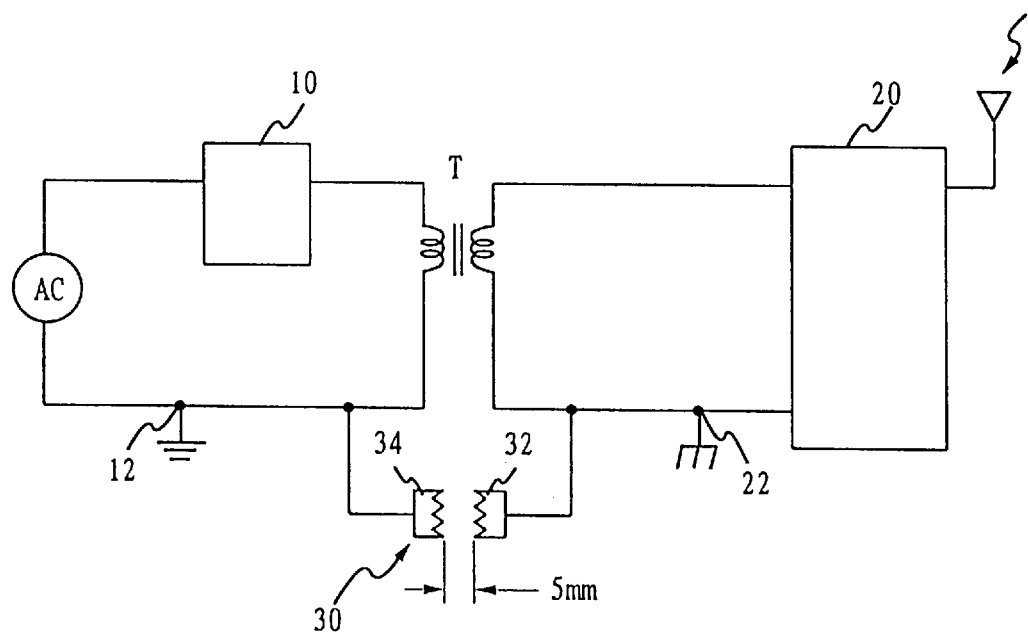
FIG. 1 is a diagram showing the construction of a conventional surge protecting circuit for an electronic product.
Figure 2:
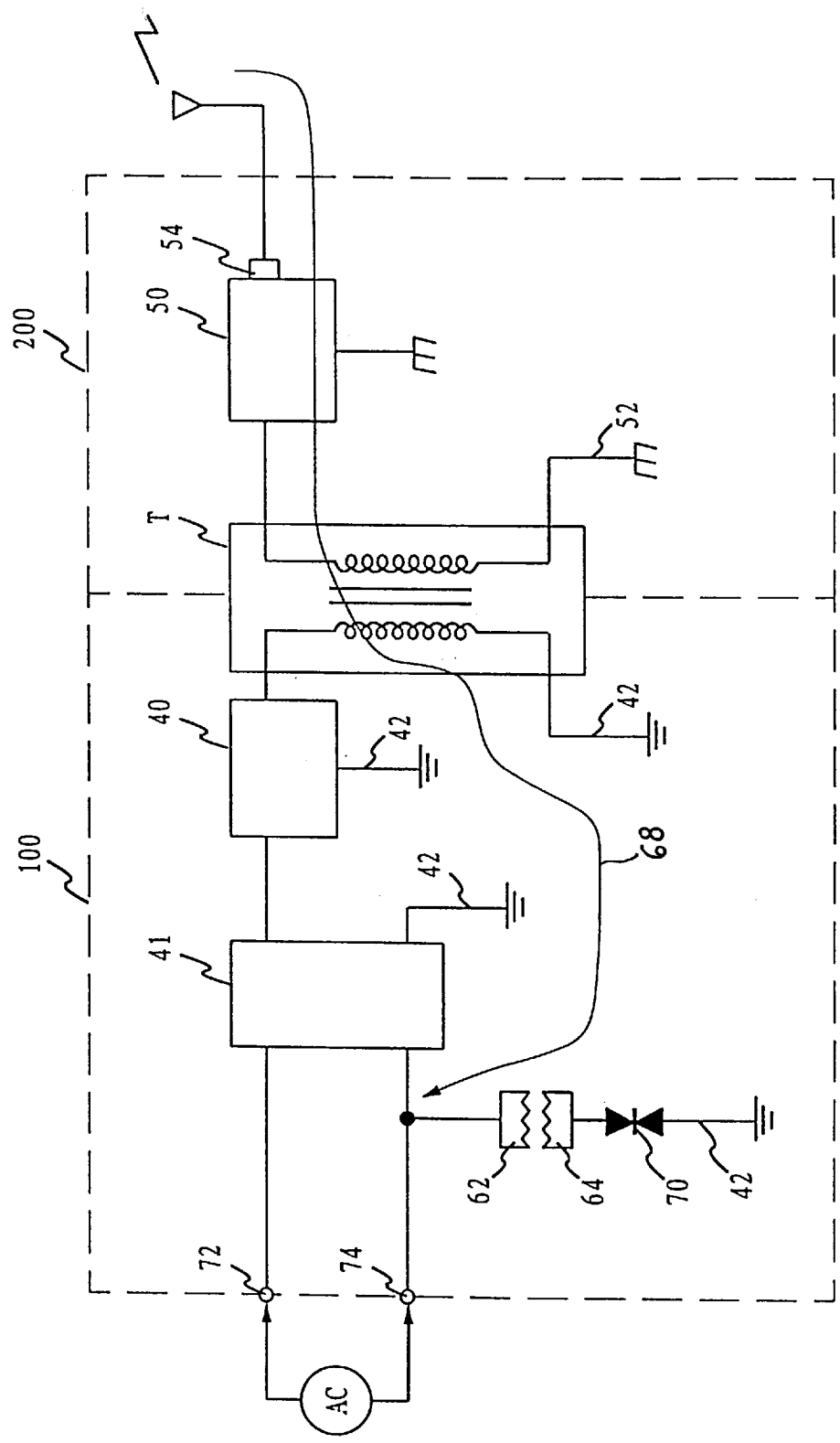
FIG. 2 is a diagram showing the construction of a surge protecting circuit for an electronic product according to the present invention.

Referring to FIG. 2, an AC input circuit 100 for receiving commercial AC power through a pair of AC terminals 72 and 74 has an AC ground pattern 42, a rectifying circuit 41 for rectifying the commercial AC power, and a switching regulating circuit 40 for regulating a rectified voltage by the rectifying circuit 41, whereby the rectified voltage is supplied to a primary winding of a transformer T.

A DC operating circuit 200, which is powered by a DC voltage from a secondary winding of the transformer T, has a DC ground pattern 52 which is separated from the AC ground pattern 42 by a safety distance. The DC operating circuit 200 also includes a terminal 54 for connecting an antenna to a DC circuit 50, whereby external surges are transmitted to the DC operating circuit 200 through the antenna.

The protecting circuit portion according to the present invention is connected between the AC input terminal 74 and the AC ground pattern 42. The protecting circuit includes surge absorption patterns 62 and 64 which are separated by an arc discharge gap 66, preferably about 0.25 mm, which is shorter than the conventional safety distance (i.e., 5 mm), so as to facilitate the absorption of the external surges transmitted through the terminal 74 to the AC ground pattern 42, and a varistor 70 which is connected between the surge absorption patterns 62 and 64 and the AC ground patterns 42.

The AC input circuit 100, which is connected to the primary of the transformer T, is called "hot", and the DC operating circuit 200, which is connected to the secondary of the transformer T, is called "cold". The hot and cold power circuits are formed on the same printed circuit board. The AC ground pattern 42 of the hot and the DC ground pattern 52 of the cold are separated from each other on the printed circuit board by the safety distance. Also formed on the same printed circuit board are sharp-shaped (i.e., saw-tooth shaped) surge absorption patterns 62 and 64 having an arc discharge gap 66 of preferably about 0.25 mm between both terminals 62 and 64 so as to facilitate the arc discharge between the ground patterns 42 and 52.

The above-described circuit of the present invention operates as follows. When external surges such as lightning flow into the DC operating circuit 200 through the antenna, the surge energy is transmitted to the AC input circuit 100, the so called "hot circuit," through the transformer T. This surge energy then flows to the AC ground pattern 42 of the AC input circuit 100, whereby the surge energy is then transmitted to the surge absorption patterns 62 and 64 through the varistor 70, whereby a substantial portion of the surge energy conducting through the AC input circuit 100 is dissipated as thermal energy due to the resultant arc discharge which is generated in the arc discharge gap 66. The remaining surge energy is then transmitted to the AC input terminal 74 via an AC input line. Line 68 in FIG. 2 illustrates the path of the surge energy through the surge protecting circuit of the present invention.

The serial connection of the varistor 70 between the AC ground pattern 42 and the surge absorption patterns 62 and 64 allows the arc discharge gap 66 to be decreased while affording adequate protection to the DC operating circuit 200 from any noise that is generated by the AC power source, which noise is isolated by the varistor 70. Therefore, since the noise is cut off by the varistor 70, the arc discharge can be easily generated when the external surges are received by virtue of a smaller arc discharge gap 66, thus providing added protection to the internal circuit elements from such surges.

Although illustrative embodiments of the present invention have been described herein with reference to the accompanying drawings, it is to be understood that the invention is not limited to those precise embodiments, and that various other charges and modifications may be effected therein by one skilled in the art without departing from the scope or spirit of the present invention.

What is claimed is:

1. An improved surge protection circuit for an electronic product, the circuit comprising:

an alternating current (AC) input circuit responsive to an AC power source, having an AC ground pattern associated therewith, the AC input circuit including:
   (a) a rectifying circuit connected to said AC power source for rectifying AC power from said AC power source, said rectifying circuit being connected to said AC ground pattern;
   (b) a switch regulating circuit responsive to said rectified AC power, said switch regulating circuit being connected to said AC ground pattern;
   (c) a transformer having a primary winding and a secondary winding, said primary winding being connected to said regulating circuit for receiving said rectified power, said primary winding being connected to said AC ground pattern;
   (d) a surge absorption pattern having a pair of terminals, said terminals of said surge absorption pattern being separated by an arc discharge gap which is smaller than a safety distance, one of said terminals of said surge absorption pattern being connected to an AC input terminal of said AC input circuit; and
   (e) a varistor, said varistor being connected in series between one of said terminals of said surge absorption pattern and said AC ground pattern for isolating noise generated by said AC power source; and a direct current (DC) operating circuit being electromagnetically coupled to said AC input circuit through said transformer and having a DC ground pattern associated therewith which is separated from said AC ground pattern by said safety distance or more, the DC operating circuit including:
   (a) a DC circuit, said DC circuit receiving power from said secondary winding of said transformer, said DC circuit and said secondary winding being connected to said DC ground pattern; and
   (b) a terminal to which external surges are transmitted, said terminal being connected to said DC circuit, whereby external surges received by said terminal of said DC circuit are transmitted through said DC operating circuit to said AC input circuit through said transformer to said AC ground pattern wherein the external surge is then absorbed by an arc discharge in said arc discharge gap of said surge absorption patterns.

2. The improved surge protecting circuit as claimed in claim 1, wherein said arc discharge gap of said surge absorption patterns is about 0.25 mm.

3. In an electric device having an AC input circuit with an AC ground pattern associated therewith and AC input terminals for receiving commercial AC power, and a DC operating circuit with a DC ground pattern associated therewith and having a terminal for receiving external electrical surges, said device having a surge protection circuit which comprises:

a surge absorption pattern having a pair of terminals, said terminals of said surge absorption pattern being separated by an arc discharge gap which is smaller than a safety distance, wherein one of said terminals of said surge absorption pattern being connected to one of said AC input terminals of said AC input circuit; and a varistor, said varistor being connected in series between one of said terminals of said surge absorption pattern and said AC ground pattern for isolating noise generated by said AC power from said DC operating circuit; whereby external surges received by said terminal of said DC operating circuit are transmitted through said DC operating circuit to said AC input circuit through a transformer to said AC ground pattern wherein the external surge is then absorbed by an arc discharge in said arc discharge gap of said surge absorption patterns.

4. The improved surge protecting circuit as claimed in claim 3, wherein said arc gap of said surge absorption patterns is about 0.25 mm.

* * * * *